Patented Sept. 7, 1937

2,092,238

UNITED STATES PATENT OFFICE 2,092,238

QUINPHTHALONE DYE

James R. Bailey, Austin, Tex., assignor to Union Oil Company of California, Los Angeles, Calif., a corporation of California No Drawing. Application August 13, 1932, Serial No. 628,770

1 Claim. (Cl. 260—38)

This invention relates to dye stuffs and processes for making the same. In a narrower sense it relates to new and useful quinphthalone dyes which may be obtained from certain alkylated quinolines, and more especially methylated quinolines, by subjecting them to a condensation reaction with phthalic anhydride.

It is an object of this invention to produce new and valuable dyes of great fastness to light, from a series of alkylated quinolines (e. g. methylated quinolines), which may be extracted from readily available sources and cheap raw materials, not heretofore known to contain such intermediates. Examples of such sources are the various crude petroleum distillates obtained by the heat treatment of crude oils, especially the asphaltic California and South American oils, the pyrolytic distillates of cottonseed meal, the various shale oil distillates and the like.

An especially abundant and easily available supply of alkylated quinolines which form quinphthalone dyes is found in some of the mixtures of nitrogen bases which may be extracted from the various petroleum distillates referred to above. There are several methods by which this extraction can be carried out. For instance, the nitrogen bases may be extracted from the crude petroleum distillates by repeated washing with dilute acid, preferably dilute sulphuric acid. Another method by which mixtures of nitrogen bases may be obtained, consists in extracting the aforementioned petroleum distillates with liquid sulphur dioxide according to the well known Edeleanu process (U. S. Patent No. 911,553). The "extract", obtained by vaporizing the major portion of the sulphur dioxide from the extract phase, is extracted with a dilute acid or with water for instance on countercurrent stream contact to obtain an aqueous solution of the acid salts of the bases. The free bases may then be obtained as a crude mixture by adding a base such as sodium hydroxide or ammonium hydroxide to the aforementioned aqueous solution.

This method of extracting the nitrogen bases has been fully described and claimed in my co-pending application Serial No. 590,913.

The mixtures of nitrogen bases, extracted from the aforementioned petroleum distillates, especially those distillates boiling within the kerosene range, are composed of aromatic nitrogen bases, which consist in the main of alkylated quinolines such as methylated quinolines, together with hydroaromatic nitrogen bases which may be considered as piperidine derivatives. Experiments have proved that the presence of hydroaromatic nitrogen bases is detrimental to the obtainment of a large yield of quinphthalone dyes and hence it is desirable to separate the hydroaromatic bases from the alkylated quinolines, which are aromatic in character. The most efficient process of separating these two types of bases consists in dissolving a mixture of bases containing both types, in dilute hydrochloric acid and extracting the aqueous solution of the hydrochlorides so produced, with organic solvents such as, for instance, chloroform or ethylene dichloride, or any appropriate organic solvent non-miscible with water. On separating the two phases which have formed, one finds the aromatic bases concentrated in the aqueous phase while the chloroform or other solvent phase contains substantially all the hydroaromatic bases. The free, aromatic, alkylated quinolines may be obtained by adding a base to their hydrochlorides dissolved in the aqueous phase referred to above. Other methods of separating hydroaromatic nitrogen bases from aromatic nitrogen bases are disclosed and claimed in my co-pending application Serial No. 638,195.

The quinolines from which I prepare my quinphthalone dyes all contain alkyl groups (e. g. methyl groups) in the 2 or 4 position. While other alkyl groups may be present in the heterogeneous ring, the presence of alkyl groups in the 2 or 4 position appears to be necessary for the formation of quinphthalone dyes.

Since the nature or extent of the alkylation has only little effect on the shade of color of the corresponding phthalones, it is practical to produce a valuable dye from a mixture of alkylated quinolines without having to resort to any process of fractionating them into narrow cuts or individual compounds.

All condensation reactions between the alkylated quinolines and phthalic anhydride are carried out in the absence of a condensing agent.

In its broadest sense my invention resides in extracting a mixture of nitrogen bases from a number of raw material sources such as petroleum oils and analogous materials, separating the alkylated quinolines (e. g. methylated quinolines) and condensing with phthalic anhydride either the entire amount or any fraction thereof to produce new quinphthalone dyes. The alkylated quinolines are usually contaminated with hydroaromatic bases which should preferably be removed before my dyes may be prepared and hence my invention also resides in removing the hydroaromatic bases from the alkylated, (e. g. methylated) quinolines and forming the quinphthalone dyes from said quinolines, substantially free from admixture.

My invention also resides in those dyes recovered from natural sources as indicated above. Such dyes are of the general class represented by phthalic anhydride condensation products of 2,8 dimethylquinoline, 2,3,8 trimethylquinoline and 2,4,8 trimethylquinoline recovered from the stated sources. This invention further resides in any mixed dye made from any mixture of alkylated quinolines, capable of condensing with phthalic anhydride, especially where those mixtures are obtained from such natural sources as above set forth. The invention further includes any individual dye obtained from such mixtures. Also the invention includes the individual dyes made from 2,8 dimethylquinoline, 2,3,8 trimethylquinoline and 2,4,8 trimethylquinoline mentioned above, by condensing these quinolines with phthalic anhydride.

The general class of quinolines indicated above is characterized by having at least one alkyl group in the heterogenous ring in addition to a single alkyl group in the homogenous ring, the alkyl group being in the 8 position. Should only one alkyl group be present in the heterogenous ring, it should preferably be in position 2 or 4. One of the characteristic properties of the above identified class of dyes is that its members are faster to light and alkalies than any of the known quinphthalones.

The first step of my preferred method for producing a mixed quinphthalone dye from a mixture of alkylated quinolines which may contain besides others, those methylated quinolines from which I have prepared three specific new dyes, the manufacture of which will be described later on in this specification, consists in extracting a mixture of nitrogen bases from a petroleum distillate (for instance those distillates produced from the asphaltic California oils) or from any of the analogous sources previously referred to. This mixture of nitrogen bases is then resolved into aromatic nitrogen bases and hydroaromatic ones by the process described above. The aromatic nitrogen bases which contain the desired alkylated quinolines are condensed with phthalic anhydride at appropriate temperatures and a spirit soluble quinphthalone dye is obtained. Should a water soluble dye be desired, the spirit soluble dye may be sulphonated by any of the well established methods and the sodium salt or any water soluble salt prepared from the corresponding disulphonic acids.

The following specific example will illustrate how a mixed phthalone dye may be prepared, starting from a petroleum distillate.

A kerosene distillate produced from a California McKittrick crude oil and boiling between 350–550° F. is extracted with liquid sulphur dioxide according to the process outlined earlier in this specification and a mixture of nitrogen bases, containing aromatic and hydroaromatic bases is obtained. The entire mixture is dissolved in 1:1 hydrochloric acid to form an aqueous solution of the hydrochlorides of all the bases present therein. The so obtained aqueous solution of the aforementioned hydrochlorides is extracted with from 1 to 2 times its volume of chloroform or ethylene dichloride. As the latter two solvents are immiscible with water, a separation into two phases will take place very readily. The hydroaromatic hydrochlorides are more soluble in the organic solvents referred to above than the aromatic hydrochlorides which tend to remain in the aqueous solution. On separating the two phases, one obtains in the aqueous phase a high concentration of aromatic nitrogen bases containing the alkylated quinolines from which I propose to make my quinphthalone dye, while the ethylene dichloride phase, or the chloroform phase, as the case may be, contains a high concentration of the hydroaromatic nitrogen bases. The aqueous phase may be extracted with a small amount of chloroform or ethylene dichloride to remove any hydroaromatic bases present therein and the organic solvent phase may be extracted with a small amount of water to remove any aromatic bases present. The two aqueous solutions are combined and one obtains a solution of the hydrochlorides of the aromatic bases, (containing the desired alkylated quinolines, e. g. methylated quinolines) substantially free from admixture. The free aromatic bases are obtained from the solution of their hydrochlorides by adding thereto an inorganic base such as sodium hydroxide or ammonium hydroxide. It has been found practical to subsequently dry these bases with a suitable drying agent such as sodium sulphate or solid sodium or potassium hydroxide. This mixture of alkylated quinolines is then heated with approximately an equal weight of phthalic anhydride at a temperature of from 180–250° C. for a period of from three to eight hours. A yellow to brown "crude melt" forms due to the condensation of the mixture of quinolines and the phthalic anhydride. After cooling to about room temperature, the melt is introduced into concentrated sulphuric acid and the acid solution is poured into a volume of water, about ten times that of the acid used. The mixed quinphthalone dye separates from the aqueous solution as a crystalline solid which may be isolated by subjecting the solution to a filtering process and washing the residue with a little water. The dye so obtained is made up out of quinphthalone dyes formed from any of the alkylated quinolines (including the methylated quinolines) present in the original mixture of nitrogen bases, all quinolines reacting having alkyl groups in either the 2 or 4 position in the nucleus, while some of them have a single alkyl group in the homogeneous ring of the quinoline molecule in the 8 position as well.

This dye may be readily used as a spirit soluble dye for dyeing fabrics such as wool or silk a bright yellow color which is fast to light and various cleaning agents. The cost of manufacture of this dye is only a fraction of the cost of manufacturing the corresponding dyes from the synthetic products and for commercial purposes is in no way inferior.

A water soluble dye may be made from the spirit soluble one mentioned above, by heating the crude melt resulting from the phthalic anhydride condensation, with ten times its weight of fuming sulphuric acid (about 20% anhydride content) for a period of approximately two hours at a temperature of approximately 150° C. On pouring the reaction mixture into about ten times its volume of water, and neutralizing the acid with sodium carbonate, the sodium salt of the disulphonic acids of this mixed quinphthalone dye may be obtained by salting out with sodium chloride and drying the yellow precipitate formed, at a temperature above the boiling point of water. This sodium salt constitutes the water soluble derivative of the spirit soluble dye mentioned above and in an acid bath dyes a number of fabrics such as silk and wool a bright yellow color.

For the purpose of producing uniform mixed dyes especially as pertains to color and fastness it may be desirable to roughly fractionate a crude mixture of aromatic nitrogen bases into fractions of comparatively large boiling point range, each fraction containing certain specific alkylated quinolines and produce my quinphthalone dyes from these fractions. Thus, for instance, I may desire to produce mixed quinphthalone dyes from the fraction of aromatic nitrogen bases boiling between 200-300° C. In order to obtain such a fraction of aromatic bases, the only requirement necessary, is to take the entire amount of aromatic bases extracted from any of the sources previously referred to and roughly fractionally distill this mixture, collecting the fraction boiling between the desired limits. In doing this, the mixed quinphthalone dyes produced may be such that they will always contain substantially the same alkylated quinolines in substantially the same proportions, making the resulting products uniform in all respects.

I have discovered that by carefully fractionally distilling under reduced pressure the mixture of nitrogen bases from which I prepare the mixed phthalone dye by the process described in the preceding example and collecting three fractions boiling from 272-280° C., 266-275° C., and 248-258° C., respectively, I may prepare three new and useful quinphthalone dyes from three specific methylated quinolines which were present in the aforesaid distillation of fractions. These methylated quinolines are: 2,3,8 trimethylquinoline present in the 272-280° C. fraction, 2,4,8 trimethylquinoline present in the 266-275° C. fraction and 2,8 dimethylquinoline present in the 248-258° C. fraction.

The following will illustrate the processes by which I may prepare the phthalone dyes from each of the aforesaid methylated quinolines, using as starting material a California kerosene distillate boiling between 350-550° F., the distillate having been produced from a McKittrick crude oil.

A mixture of free nitrogen bases is extracted from the above mentioned California kerosene distillate by the sulphuric acid or liquid sulphur dioxide process described earlier in this specification. This mixture is then carefully fractionally distilled under reduced pressure and a fraction boiling between 272-280° C. (atmospheric pressure) is isolated. The two main components of this fraction are 2,3,8 trimethylquinoline and hydroaromatic base $C_{16}H_{25}N$ which is a piperidine derivative. The two bases are separated by the following procedure: the aforementioned fraction is dissolved in a sufficient amount of 1:1 hydrochloric acid to form an aqueous solution of the hydrochlorides of the bases and this solution is extracted with chloroform or ethylene dichloride. A separation of the solution into two phases takes place. The 2,3,8 trimethylquinoline hydrochloride remains dissolved in the aqueous phase while the hydrochloride of the $C_{16}H_{25}N$ base dissolves in the chloroform or ethylene dichloride phase. The two phases are separated and each is reduced by evaporation to a small volume. On cooling the aqueous phase containing the hydrochloride of the 2,3,8 trimethylquinoline and adding a little acetone thereto, the hydrochloride of this base precipitates almost quantitatively as a white crystalline solid. The free base is then obtained by adding ammonium hydroxide to the crystalline hydrochloride. It has been found desirable to dry the free base before an attempt is made to produce the quinphthalone dye therefrom.

About equal weights of 2,3,8 trimethylquinoline and phthalic anhydride are then heated at a temperature of from 180-250° C. over a period of from three to eight hours. A brownish yellow melt is formed which is cooled and subsequently dissolved in about twice its weight of concentrated sulphuric acid, whereupon the resulting solution is poured into a volume of water, about ten times that of the acid used. The phthalone dye settles out of the solution as a yellow crystalline precipitate. The solution is filtered and the precipitated quinphthalone dye is washed with a small amount of water. The dye is of sufficient purity to be used for commercial purposes. Should any 2,3,8 trimethylquinoline remain unacted upon, it may be recovered by neutralizing the filtrate with caustic soda and removing the base which floats on the surface of the solution.

The formula of the quinphthalone is:

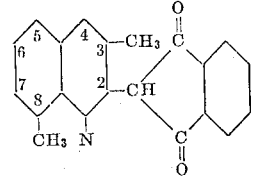

The following are some of its characteristic properties: melting point 236° C., insoluble in water, very slightly soluble in ether, soluble in alcohol, quite readily soluble in boiling glacial acetic acid, sublimes undecomposed at 200-230° C. The phthalone itself is a spirit soluble dye which dyes wool and silk a very bright yellow color. The presence of a methyl group in the 8 position in the quinoline nucleus renders this dye extremely fast to light and stable towards any washing agents used for cleaning purposes.

Should a dye of extreme purity be desired one may take the phthalone obtained according to the process outlined above, dissolve it in alcohol and add enough sodium alcoholate to the solution to precipitate the sodium salt. On hydrolyzing this salt with water one obtains the pure phthalone and sodium hydroxide. A highly purified phthalone may also be obtained by recrystallizing the phthalone from glacial acetic acid and then from alcohol, the resulting product consisting of fine microscopic yellow needles.

For the use as a water soluble dye for wool and silk fabrics the phthalone is sulphonated and the disulphonic acid converted to the sodium salt by the following procedure: the phthalone is heated with ten times its weight of fuming sulphuric acid (20% anhydride content) for two hours at 150° C. and the reaction mixture poured into ten times its volume of water. The acid solution is neutralized with sodium carbonate and the sodium salt of the sulphonated phthalone salted out with sodium chloride. The sodium salt filtered off and dried at 110° C., constitutes a water soluble dye which in an acid bath imparts to wool and silk fabrics a bright canary yellow color exceptionally fast to light and alkalies. The disulphonic acid of the phthalone has the empirical formula $C_{20}H_{13}O_2N(SO_3H)_2$ and the sodium salt the empirical formula $$C_{20}H_{13}O_2N(SO_3Na)_2.$$

The above mentioned sodium salt may also be obtained by sulphonating the crude melt resulting from the condensation of the 2,3,8 trimethylquinoline base and phthalic anhydride without attempting to first isolate the spirit soluble quinphthalone.

The second new quinphthalone dye, namely the one produced from 2,4,8 trimethylquinoline is obtained as follows:

A mixture of nitrogen bases extracted from a California kerosene distillate according to any of the processes described in the previous example, is carefully fractionally distilled under reduced pressure to obtain a fraction boiling from 266–275° C. (atmospheric pressure). About 500 c. c. of this fraction is treated with a sufficient amount of 1:1 hydrochloric acid to dissolve all the bases as hydrochlorides and the resulting aqueous solution is extracted with about 800 c. c. of chloroform or ethylene dichloride. On extraction, the solution separates into two phases of which the organic solvent phase may be discarded for the purposes of this invention. The aqueous phase, containing the 2,4,8 trimethylquinoline hydrochloride together with some admixed hydrochlorides of other aromatic bases, is commingled with sodium hydroxide to liberate about 125 c. c. of aromatic bases. The 2,4,8 trimethylquinoline is isolated by the following procedure: about 80 grams of picric acid is dissolved in alcohol to form a saturated solution. Portions of this solution each containing 20 grams of picric acid are added to the 125 c. c. of aromatic bases until no more crystalline precipitate forms. This precipitate consists almost entirely of the picrate of 2,4,8 trimethylquinoline, and after being filtered and washed with alcohol, it needs no further purification. The free base may be obtained from the aforementioned picrate by the addition of ammonium hydroxide.

The 2,4,8 trimethylquinoline is then dried with a suitable drying agent such as sodium sulphate, solid sodium or potassium hydroxide. The quinphthalone dye may be prepared from the 2,4,8 trimethylquinoline by the identical procedure as outlined in the previous example, illustrating the manufacture of quinphthalone dye from 2,3,8 trimethylquinoline. The sulphonation process and the formation of the sodium salt may also be carried out in an identical manner as previously described. The properties of the quinphthalone dye from the 2,4,8 trimethylquinoline are substantially identical to those of the quinphthalone dye produced from 2,3,8 trimethylquinoline. The structural formula for this quinphthalone is:

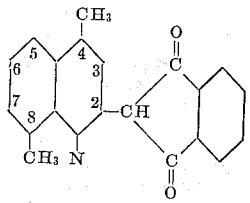

My third new phthalone dye is prepared from 2,8 dimethylquinoline which is present in the 248–258° C. fraction of the nitrogen bases obtained by carefully fractionally distilling under reduced pressure, a mixture of nitrogen bases extracted from a California kerosene distillate by the processes outlined earlier in this specification.

This methylated quinoline may be obtained from the above mentioned fraction by the following procedure: an amount of 1:1 hydrochloric acid, sufficient to form an aqueous solution of the hydrochlorides of all of the bases present, is added to about 500 c. c. of the fraction referred to above and the aqueous solution is extracted with about 800 c. c. of chloroform. The two phases which have formed are separated and the aqueous solution of the hydrochlorides of the aromatic bases is treated with enough sodium hydroxide to liberate the free bases which are subsequently dried with sodium sulphate. This mixture of aromatic bases is then dissolved in hot alcohol and an equivalent of picric acid (the equivalent calculated by determining the nitrogen content of the mixture of aromatic bases and assuming all of them are dimethylquinolines), dissolved in enough hot alcohol to make a saturated solution, is added thereto. On cooling, the picrate of the 2,8 dimethylquinoline precipitates as a yellow crystalline solid which is separated from the alcoholic medium by filtration. The free 2,8 dimethylquinoline is subsequently obtained by addition of ammonium hydroxide to its picrate and is dried with sodium sulphate.

The spirit soluble quinphthalone dye may be prepared from the 2,8 dimethylquinoline by heating approximately equal weights of the latter and phthalic anhydride at about 180–250° C. for a period of from three to eight hours. The quinphthalone thus produced has the following structural formula:

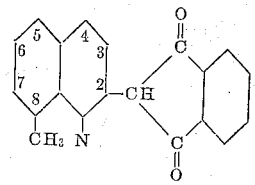

Its properties, as pertain to color and fastness to light, etc., are substantially identical to the quinphthalone produced from 2,3,8 trimethylquinoline.

All of the steps used in the preparation of the spirit soluble quinphthalone dye from 2,8 dimethylquinoline as well as those used in the obtainment of the sodium salt of its disulphonic acid are identical to those described for the two other specific dyes described above.

Suitable water soluble dyes have been indicated to be sodium salts of the disulphonic acids of the various quinphthalones herein described. There are other water soluble salts besides the sodium salts which also may be used for dyeing purposes. Some of these are the ammonium salts, the zinc salts, the calcium salts and the potassium salts. The sodium derivatives, however, are to be preferred from the standpoint of economy.

The petroleum distillates from which the alkylated quinolines or more specifically the methylated quinolines or their mixtures were extracted have been disclosed to be kerosene distillates boiling between 350–550° F. Mixtures of nitrogen bases containing the aforementioned quinolines may also be extracted from the upper portion of the gasoline distillates, i. e., the fraction boiling within the range of 300–450° F. or from the lower portion of the gas oil distillates, i. e., the fraction boiling from 450–650° F.

In addition to the mixtures of nitrogen bases extracted from the petroleum distillates and other sources referred to earlier in this specification, i. e., shale oil distillates or the pyrolytic distillates of cottonseed meal, I may extract analogous mixtures of nitrogen bases from various animal and vegetable oils or residues which are high in nitrogen content. Typical examples of such sources are fish meal, especially the sardine meal remaining after the oil has been extracted therefrom and the residue of soya beans and castor beans remaining after the oil has been extracted. These sources are known to have nitrogenous bodies or to yield nitrogenous bodies as upon heat treatment. In any mixture of nitrogen bases extracted therefrom and boiling within the same range as the mixtures of nitrogen bases extracted from petroleum distillates, one may expect to find the same alkylated quinolines (e. g., methylated quinolines) as may be extracted from the other natural sources referred to earlier in this specification.

The specific quinolines from which I have prepared my three individual dyes or the water soluble salts of their disulphonic acids, have been disclosed to be methylated quinolines of the class containing at least one alkyl group in the heterogeneous ring (if only one alkyl group is present, it should preferably be in position 2 or 4) in addition to a single alkyl group in the 8 position in the homogeneous ring. Other quinolines which would fall into this class are 3,4,8 trimethylquinoline, 4,8 dimethylquinoline and the corresponding higher alkylated quinolines such as, for instance, 2 methyl, 8 ethylquinoline.

All of the quinphthalone dyes derived from the above described class of quinolines are extremely fast to light; they are quite readily soluble in alcohol and are easily sulphonatable and transferable into water soluble dye stuffs by the processes hereinbefore described. Bases containing the other members of the alkyl series such as ethyl, propyl and butyl substituted in the quinoline nucleus in the identical places where methyl groups have been previously disclosed to be present, form quinphthalone dyes of similar characteristics. Observations indicated that there are no appreciable differences in either color or fastness between the quinphthalone dyes produced from alkylated quinolines containing only methyl groups and those produced from quinolines containing higher alkyl groups such as ethyl or propyl.

The nitrogen bases produced from petroleum or on pyrolysis of protein materials and found in the chlorinated solvent layer are not of the true aromatic type of piperidine or coniine as is evidenced by the fact that they are not susceptible to dehydrogenation (see Bailey et al. Journal American Chemical Soc. 55, 4145, 1933). The difficulty in classifying these compounds arises from the fact that their identities have not been completely established. In view of the specification I wish to define the bases whose salts are relatively insoluble in the chlorinated solvents, set out above, as aromatic bases and those bases whose salts are soluble therein as hydro-aromatic bases.

The various examples given in this specification are not to be considered as limitations thereon, as many variations may be made within the scope of the appended claim.

I claim:

A mixed quinphthalone dye consisting of a condensation product of phthalic anhydride and a mixture of petroleum alkylated quinolines, extracted from California asphalt base petroleum, said dye being substantially free from non-crystalline reaction products of phthalic anhydride and hydro-aromatic petroleum nitrogen bases.

JAMES R. BAILEY.